(12) United States Patent
Ferrigno et al.

(10) Patent No.: US 7,035,583 B2
(45) Date of Patent: Apr. 25, 2006

(54) TALKING BOOK AND INTERACTIVE TALKING TOY FIGURE

(75) Inventors: Albert J. Ferrigno, Floral Park, NY (US); Laurie Guiliano Duke, Halesite, NY (US)

(73) Assignee: Mattel, Inc., El Segundo, CA (US)

( * ) Notice: Subject to any disclaimer, the term of this patent is extended or adjusted under 35 U.S.C. 154(b) by 143 days.

(21) Appl. No.: 10/752,375

(22) Filed: Jan. 6, 2004

(65) Prior Publication Data

US 2004/0191741 A1 Sep. 30, 2004

Related U.S. Application Data

(63) Continuation of application No. 09/498,051, filed on Feb. 4, 2000, now Pat. No. 6,697,602.

(51) Int. Cl.
*G09B 5/04* (2006.01)

(52) U.S. Cl. ............... 434/308; 446/175; 446/302

(58) Field of Classification Search ........ 434/308–311, 434/317; 446/175, 300, 302
See application file for complete search history.

(56) References Cited

U.S. PATENT DOCUMENTS

| | | | |
|---|---|---|---|
| 4,391,367 A | 7/1983 | Perego | |
| 4,777,938 A | 10/1988 | Sirota | |
| 4,809,246 A | 2/1989 | Jeng | |
| 4,840,602 A | 6/1989 | Rose | |
| 4,846,693 A | 7/1989 | Baer | |
| 4,925,025 A | 5/1990 | Anten et al. | |
| 4,990,092 A | 2/1991 | Cummings | |
| 5,059,149 A | 10/1991 | Stone | |
| 5,356,296 A | 10/1994 | Pierce et al. | |
| 5,407,376 A | 4/1995 | Avital et al. | |
| 5,413,355 A | 5/1995 | Gonzalez | |
| 5,417,575 A | 5/1995 | McTaggart | |
| 5,419,705 A | 5/1995 | Sandvik | |
| 5,484,292 A | 1/1996 | McTaggart | |
| 5,501,627 A | 3/1996 | Ekstein | |
| 5,520,544 A | 5/1996 | Manico et al. | |
| 5,538,430 A | 7/1996 | Smith et al. | |
| 5,547,412 A | 8/1996 | Wilcox | |
| 5,569,868 A | 10/1996 | Leung | |
| 5,636,994 A | 6/1997 | Tong | |
| 5,645,432 A | 7/1997 | Jessop | |

(Continued)

*Primary Examiner*—Kien Nguyen
(74) *Attorney, Agent, or Firm*—Akin Gump Strauss Hauer & Feld, LLP

(57) ABSTRACT

A talking book is combined with a talking, animated toy figure. Each includes a sound synthesizer, a digital memory including at least some speech data to be used by the synthesizer to produce speech and a processor to control the operations of the synthesizer. Each includes a speaker coupled with the synthesizer to actually produce speech and other sounds. The book includes two outer covers and two inner pages, each with some printing. Depressible switches are provided on the inner covers to cue the processor to generate sounds appropriate to the print near the depressed cover switch. Switches in a hinge pin received in hinge rings provided each cover and page to join the covers and pages together are depressed by cam surfaces inside the ring of the front cover and each page and signal, the processor the configuration of the book. In addition to generating its own speech, the book processor transmits a control signal to the processor of the toy figure cuing that processor to generate control signals to generate the appropriate sound and/or sound by the figure synthesizer and/or animation control signals to animate the toy figure. Thus, actions of the toy figure are coordinated with the information provided in the book.

25 Claims, 5 Drawing Sheets

U.S. PATENT DOCUMENTS

| | | |
|---|---|---|
| 5,733,131 A | 3/1998 | Park |
| 5,752,880 A | 5/1998 | Gabai et al. |
| 5,795,213 A | 8/1998 | Goodwin |
| 5,803,748 A | 9/1998 | Maddrell et al. |
| 5,807,176 A | 9/1998 | Forsse et al. |
| 5,851,119 A | 12/1998 | Sharpe, III et al. |
| 5,855,502 A | 1/1999 | Truchsess |
| 5,864,626 A | 1/1999 | Braun et al. |
| 6,011,489 A | 1/2000 | Ki Kwan et al. |
| 6,064,855 A | 5/2000 | Ho |
| 6,110,000 A | 8/2000 | Ting |
| 6,330,427 B1 | 12/2001 | Tabachnik |
| 6,697,602 B1 | 2/2004 | Ferrigno |
| 2003/0129572 A1 | 7/2003 | Shuler |

TALKING BOOK AND INTERACTIVE TALKING TOY FIGURE

CROSS-REFERENCE TO RELATED APPLICATIONS

This application is a continuation of U.S. patent application Ser. No. 09/498,051, entitled "Talking Book and Interactive Talking Toy Figure", filed Feb. 4, 2000 now U.S. Pat. No. 6,697,602.

BACKGROUND OF THE INVENTION

The invention relates, in part, to talking books. A wide variety of talking books are known and are disclosed in numerous U.S. Patents including at least U.S. Pat. Nos. 4,809,246; 5,356,292; 5,417,575; 5,419,705; 5,494,292; 5,645,436; and 5,803,748. On the other hand, a number of other U.S. Patents disclose different technology and schemes for generating speech from toy figures, i.e. dolls, plush animals, etc. For example, U.S. Pat. Nos. 5,752,880 and 5,636,994 disclose wireless control of the speech and/or action of a toy figure by a conventional, personal computer with appropriate software. U.S. Pat. No. 4,846,693 discloses a system in which toy figure control signals are imbedded in the video signal of a video tape and are removed by a controller associated with the video tape player and transmitted without wires to a toy figure having a receiver configured to receive them. The signals cause the figure to generate speech which relates to the video program being generated. A hand controller is provided to permit additional signals to be sent to the toy by the user for the toy to synthesize its own speech and other sounds. U.S. Pat. No. 5,733,131 discloses a system employing pager transmission technology for simultaneous remote control of several widely spaced devices which may be toy figures. The system can cause the same message to be generated by all receiving devices or specific messages to be generated by different devices.

It is believed that a new and different form of play and educational activity can be created by combining and coordinating speech generation in a book and a toy figure to provide an interactive companion/playmate to the child using the book and an unusual remote control for the toy figure.

BRIEF SUMMARY OF THE INVENTION

Briefly stated, the present invention is a talking book. The talking book comprises a hinge pin, a plurality of book leaves, a processor, at least a first leaf position indicating switch, at least first and second mode switches, a memory, and a speaker. The plurality of book leaves include a front leaf, a back leaf, and at least one leaf therebetween. At least two of the plurality of leaves are pivotably engaged with the hinge pin at one end of each leaf. Each pivotably mounted leaf is movable between two positions on first and second lateral sides of the hinge pin. The processor is configured to generate at least a first control signal and a second control signal to at least initiate speech generation by the talking book. The at least first leaf position indicating switch operably is coupled with the processor and responsive to a pivotal position of at least a first one of the pivotably engaged leaves with respect to the hinge pin. The at least first leaf position indicating switch indicates whether the first one of the leaves is on one of the first and second lateral sides. The at least first and second mode switches are operably coupled with the processor. The memory is operably coupled with the processor and contains at least some speech data. The speaker is operably coupled with the processor to reproduce sound including speech.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
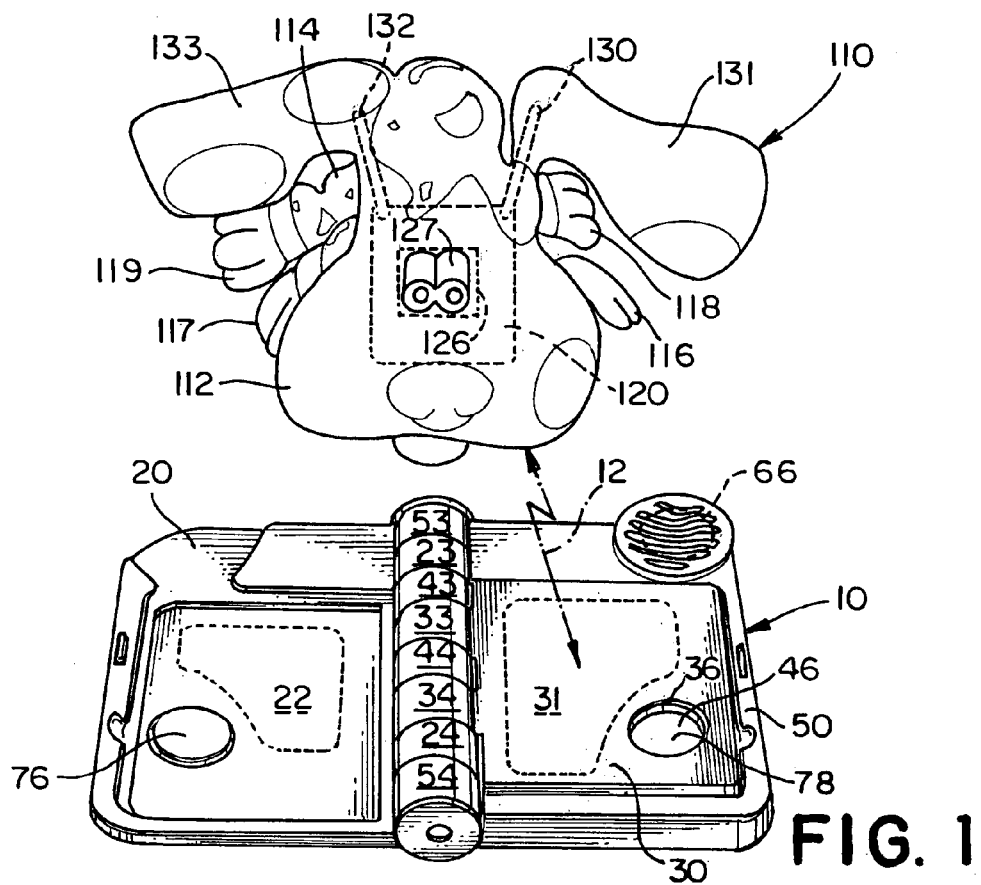
FIG. 1 is a perspective view of a talking book and talking figure combination of the present invention in a first configuration.

In the drawings, like numerals are used to indicate like elements throughout.

Figure 2:
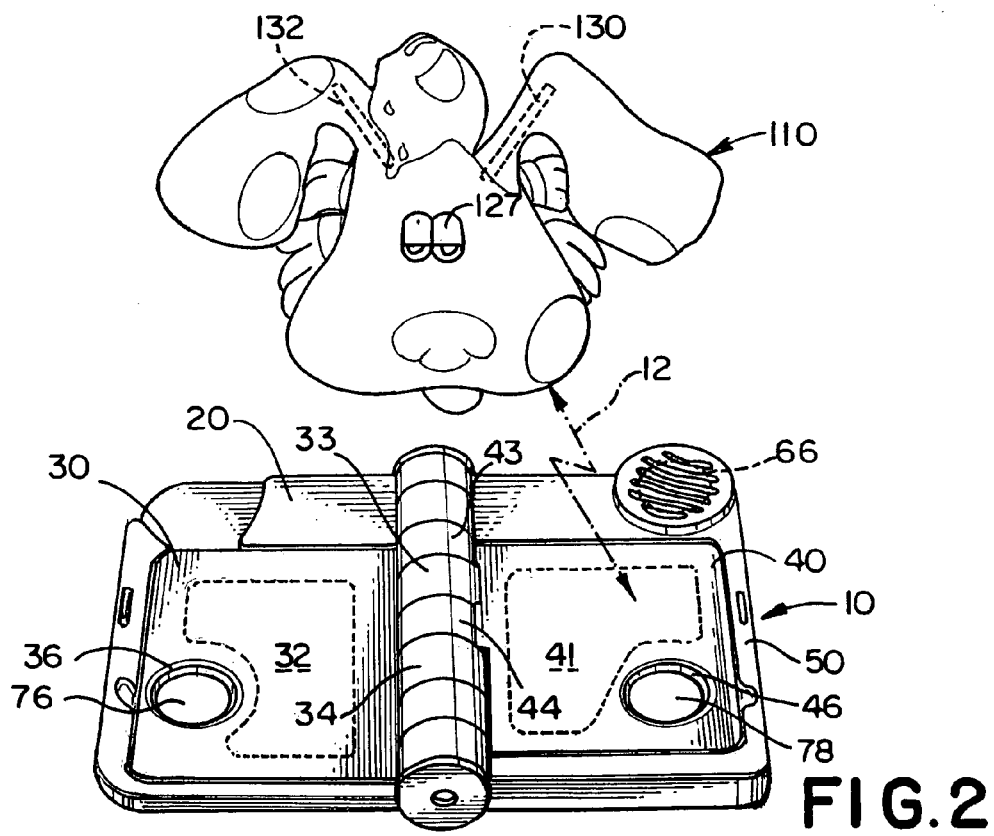
FIG. 2 is a perspective view of a talking book and talking figure combination of the present invention in a second configuration.
Figure 3:
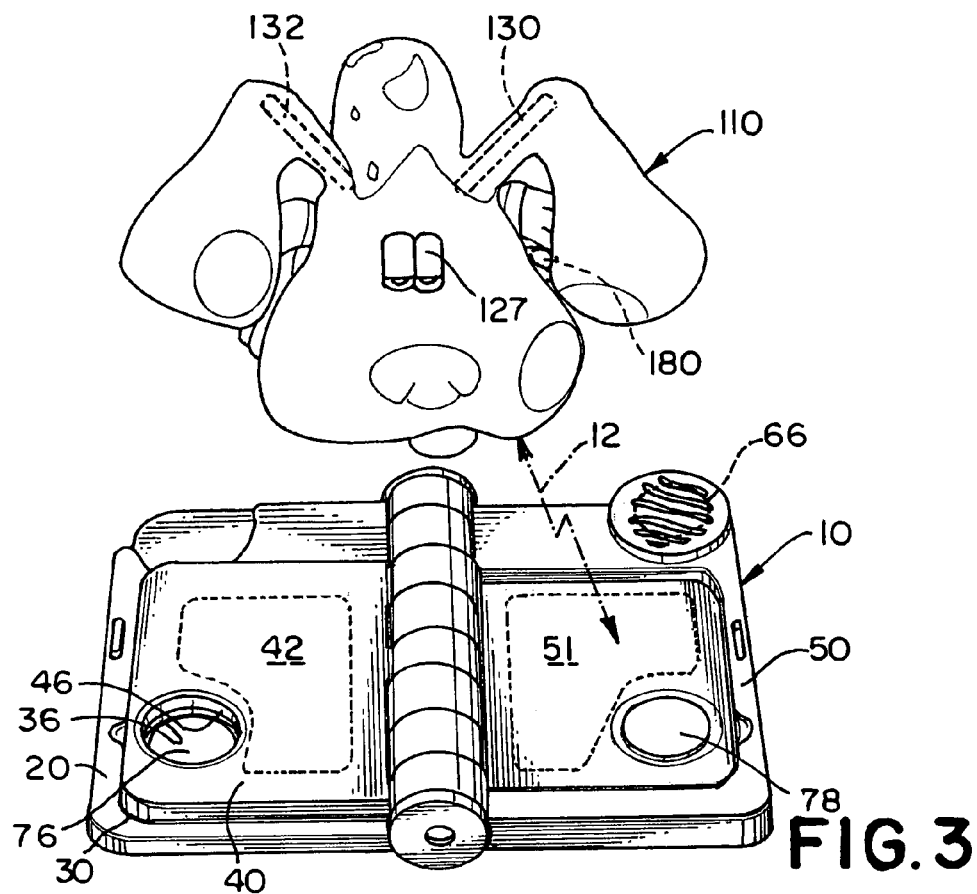
FIG. 3 is a perspective view of a talking book and talking figure combination of the present invention in a third configuration.

There is shown in FIG. 1 a talking book indicated generally at 10 and a talking, animated toy figure indicated generally at 110, which are interactive in a manner to be described. In particular, they are coupled by a communication link indicated diagrammatically by broken line 12. Talking book 10 includes a front cover 20 and a rear cover 50, both visible in FIG. 1. The talking book 10 is a book in a conventional sense in that it contains information in "printed" textual and/or graphic form to be conveyed to a user (other than merely the identity of the manufacturer and/or distributor of the device). The terms "printed", "printing" and the like are intended to refer broadly to information in a visual form rather than a particular method of providing that information on or in the book. Thus, the term encompasses not merely text and graphic information press printed directly on the cover or inner page but also embossment or other three-dimensional molding of the cover or inner page or its surface, as well as the use of press printed labels, decals and foils which are attached to the covers or inner pages of the book. Referring to FIGS. 1 through 3, the talking book 10 depicted includes a first inner page 30 with printing indicated diagrammatically by broken lines 31 and 32 on its first and second respective sides and a second inner page 40 with printing indicated diagrammatically by broken lines 41 and 42 on its first and second respective sides. In this embodiment 10, the pages 30 and 40 are nested within the inner sides of the front and rear covers 20 and 50. Front cover 20 bears its own printing indicated by broken line 22, on its inner side, and may bear printing on its outer side (not depicted). The rear cover includes printing indicated by broken line 51 on its inner side. The covers 20 and 50 and pages 30 and 40 collectively constitute the "leaves" of book 10.

Figure 5:
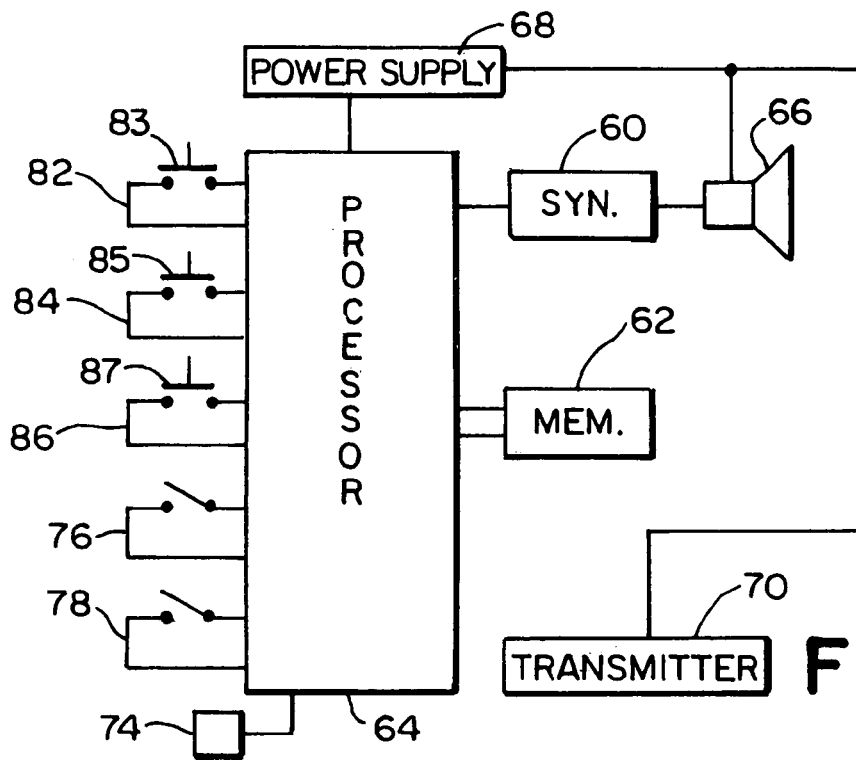
FIG. 5 is a block diagram of the electrical components of the talking book.

FIG. 5 depicts in block diagram form, the operative electromechanical components of the talking book 10. The major electrical components includes a sound synthesizer 60, a memory 62, preferably digital, which is operatively coupled with the synthesizer 60, and which contains at least some speech data, and a processor 64, which operably connects the synthesizer 60 and memory 62. The processor 64 is configured to control the synthesizer 60 in the generation of sounds (including speech) by the synthesizer 60 from digital data selected from memory 62. A speaker 66 is operably coupled with the synthesizer 60 to reproduce speech and/or other sounds (e.g., music, sound effects, etc.) based upon analog signals outputted by the synthesizer 60. Preferably, processor 64 of the talking book 10 is further configured to generate at least speech control signals, which can be transmitted to the talking toy FIG. 110 to at least initiate the generation of speech and/or other sounds by the synthesizer of that toy, as will be explained. To that end, the talking book 10 is preferably configured with a transmitter portion of the communication link 12. Preferably, talking book 10 is provided with a wireless, radio frequency transmitter 70 operably coupled with and controlled by the processor 64 to transmit control signals generated by the processor 64 to the talking toy FIG. 110. In addition or in the alternative, the processor 64 may be further provided with a plug connector 74 to provide a hard wire communication link between the talking book 10 and toy FIG. 110, if desired.

The talking book 10 is further provided with a plurality of switches, suggestedly mechanical for simplicity, which can be used to control the operation of the toy book 10 and, indirectly, the toy FIG. 110. Preferably, manually actuated, momentary contact switch 76 and 78 are provided on the inner side of the front and rear covers 20 and 50, respectively (see FIGS. 1 and 3). In addition, three spring-loaded, depressible switches 82, 84 and 86 are provided and are controlled by the position of the front cover 20 and first and second pages 30 and 40, respectively, with respect to the rear cover 50 in a manner to be described in connection with the following figures. Battery power supply 68 powers all of the electrical components.

Figure 6:
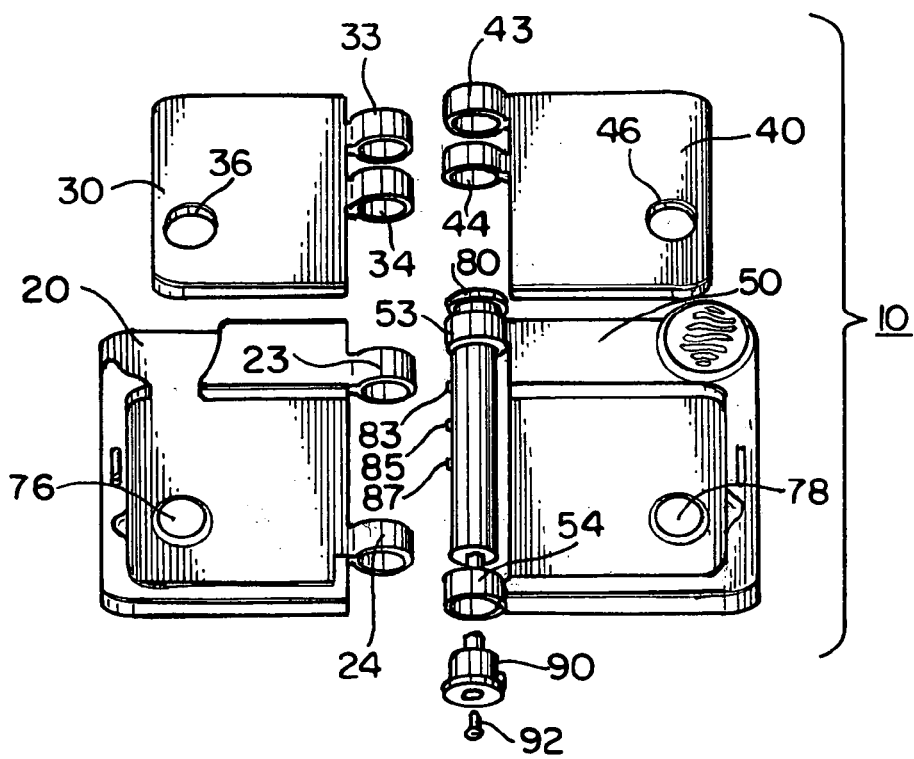
FIG. 6 is a partially disassembled perspective view of the talking book.
Figure 7:
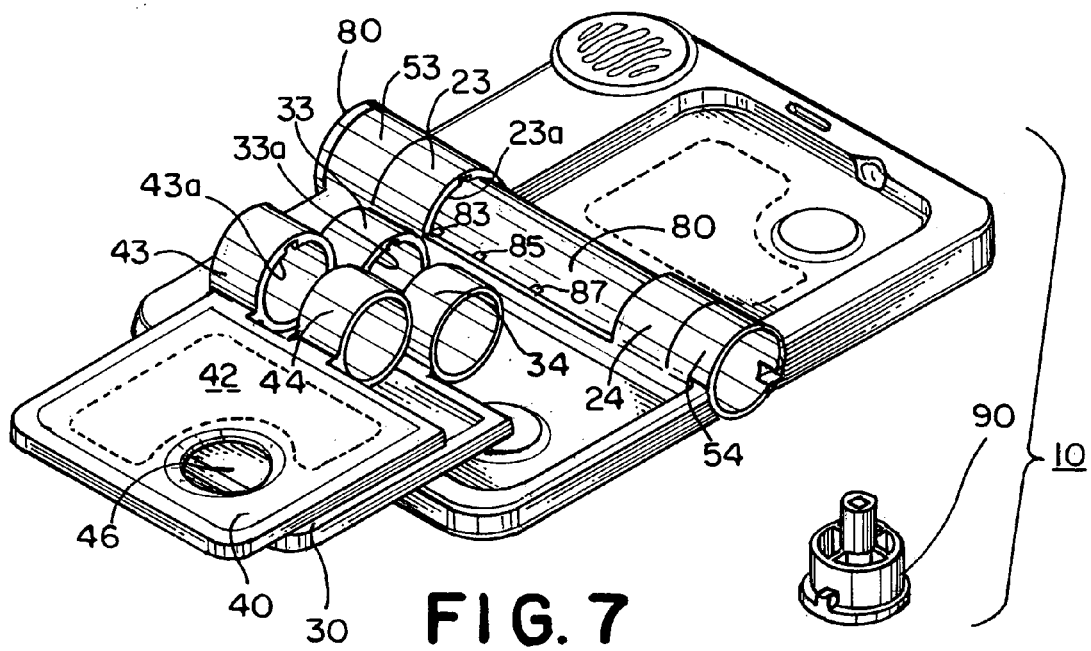
FIG. 7 is a partially reassembled perspective view of the toy book.

FIG. 6 depicts a suggested mechanical construction of talking book 10. The front and rear covers 20, 50 and first and second interior pages 30, 40 are held together by means of a hinge pin 80. Rear cover 50 includes hinge pin receiving rings 53, 54, at its extreme upper and lower ends. The front cover 20, first page 30 and second page 40 each also include a pair of pin receiving rings 23, 24, 33, 34 and 43, 44, respectively. The hinge rings 23, 24 abut rings 53, 54, respectively, while rings 33, 34, 43, 44 are alternating so that they may be interfitted with one another and between the rings 53, 54, 23, 24 of the rear and front covers 50, 20, to fully surround the hinge pin 80. Hinge pin 80 is hollow and contains the three, spring-loaded, depressible switches 82, 84 and 86. Plungers 83, 85 and 87 protrude from each switch through the circumferential wall of the hinge pin 80. One ring 23, 33 and 43 of each of the front cover 20, first page 30 and second page 40 overlaps a plunger 83, 85, 87 of a separate one of the switches 82, 84, 86, respectively, when the book 10 is fully assembled. Each overlapping ring 23, 33 and 43, includes a cam surface 23a, 33a and 43a, respectively, which contacts and depresses its underlying plunger 83, 85, 87, respectively, only when that cover or page is rotated a predetermined amount away from rear cover 50. Depression of plunger 83 by surface 23a is indicated in FIG. 7. Suggestedly the rotation is greater than ninety degrees, more suggestedly greater than 135 degrees and preferably 160 degrees or more away from the closed position against the rear cover 50 to depress the plungers 83, 85, 87 and thereby actuate the respective switches 82, 84, 86. In this way, the processor 64 is sensitive to when the book 10 is initially opened and when each of the first and second pages 30 and 40 is turned. When none of the switches 82, 84, 86 are depressed, the processor 64 consider the book 10 to be closed. Knowing these states of the front cover and inner pages, the processor 64 is able to respond to the depression of either inner cover, momentary contact switch 76, 78 to select and generate a speech or other sound bite appropriate to the information printed on the inner cover or side of the page overlying the inner cover mounting the depressed switch 76 or 78. Suggestedly, the front cover 20 is hollow and made of a pair of interfitted shells or a main shell and one or more smaller cover panels to permit the mounting of the momentary contact switch. Rear cover 50 is suggestedly formed from a pair of shells and may be used to contain all of the electrical and electromechanical components other than the switch 76 on the inside of the front cover 20 and the depressible switches 82, 84, and 86 in the hinge pin 80. Switches 76, 82, 84 and 86 are connected to the processor 64 in the rear cover 50 by wires passed throughout the front cover and hinge area of the book. The hinge pin 80 can be retained in the rings by an end cap 90 preferably releasably secured to the lower end of the pin 80 by a suitable fastener 92.

Figure 8:
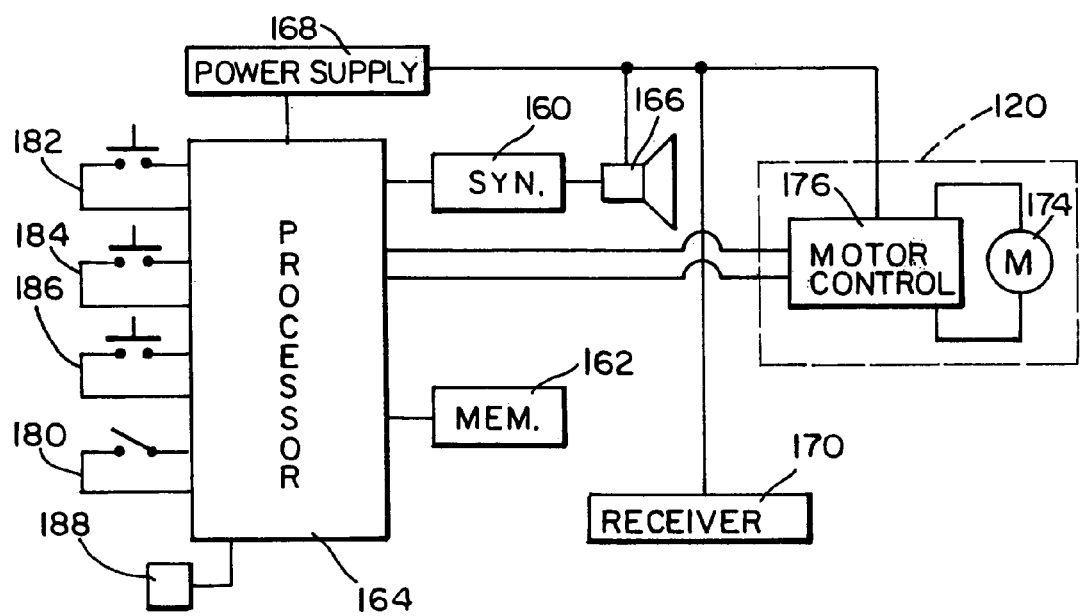
FIG. 8 is a is a block diagram of the major electrical and electromechanical components of the toy figure.

FIG. 8 is a block diagram of the major electromechanical components of the talking, animated toy FIG. 110, which are located within the toy FIG. 110. The components include a synthesizer 160 for generating speech and/or other sounds, a memory 162, preferably digital, operably coupled with the synthesizer 160 and a processor 164 operably coupled with the memory 162 and synthesizer and operably coupling those two elements together. The synthesizer 160 is preferably operably connected with a speaker 166. Again, a battery power supply 168 powers all of the electrical components. The toy FIG. 110 includes the receiver portion of the transmission link 12, preferably in the form of a wireless, radio frequency receiver 170 operably coupled with the processor 164 and with the synthesizer 160 and memory 162 through the processor 164. Memory 162 contains at least speech data and may contain data for the generation of other, non-speech sounds. It may also contain the operating program of the processor and any other data used by the processor in operating the toy FIG. 110. Alternatively, a separate memory may be provided for processor programs and/or related data. The toy FIG. 110 preferably includes an actuator indicated generally at 120 in FIGS. 8 and 9, which is operably coupled with some portion of the toy FIG. 110 to animate the portion of the toy FIG. 110 when the actuator is operated. Suggestedly, actuator 120 includes a reversible motor 174 operably coupled with the processor 164 by a motor control circuit 176. The motor control circuit 176 is responsive to control level signals from the processor 164 to supply more powerful current from the battery power supply 168 to the motor 174. A plug connector 188 may be provided in place of or in addition to the wireless receiver 170 for a hard wire communication link between the toy FIG. 110 and the talking book 10.

Figure 9:
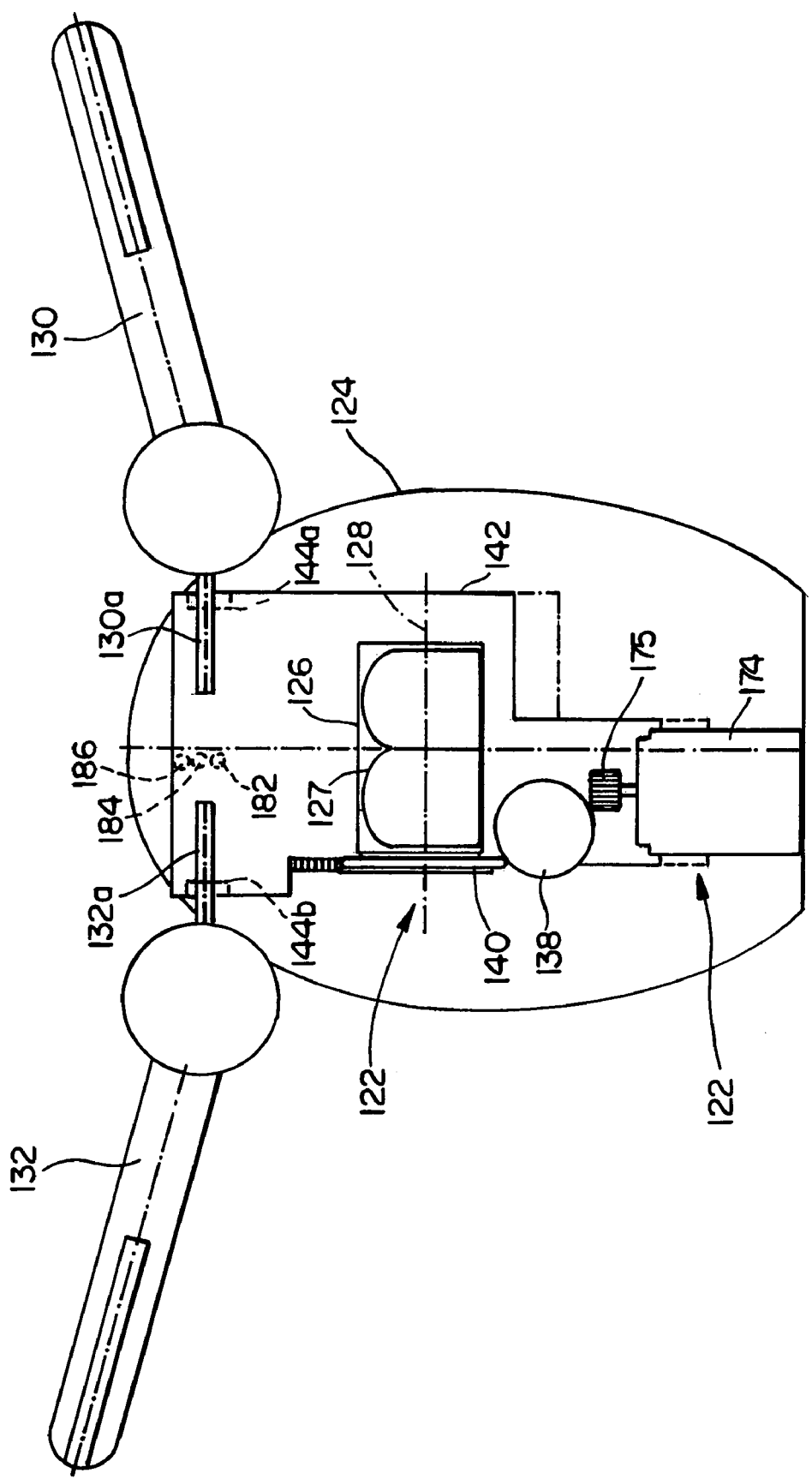
FIG. 9 is a diagram of the major components of the animated head of the toy figure.

Referring to FIG. 1, the depicted toy FIG. 110 has a conventional set of anatomical elements including a head 112 on a body 114 supporting a pair of arms 116, 117 and a pair of legs 118, 119. Preferably the animated portion of the toy figure is in the head 112. FIG. 9 depicts, in diagrammatic form, one possible construction for animating portions of the head 112 of the toy FIG. 110. An actuator 120 including the reversible motor 174 is mounted in a frame 124 within the soft outer cover of the head 112 of the toy FIG. 110. Further movably mounted to the frame 124 is a generally cylindrical member 126 which is positioned and oriented to rotate about a generally horizontal axis 128 such that its circumferential outer surface defines eyelids 127 of the toy FIG. 110. Further mounted for pivotal movement on the frame 124 are a pair of levers 130, 132, which are located within soft, flexible ears 131, 133, respectively, of the head 112. Actuator 120 further includes a linkage indicated generally at 122 which operably couples the reversible electric motor 174 with the eyelid cylinder 126 and ear levers 130, 132. As used herein, "linkage" is intended to indicate broadly a motion transferring mechanism which is not limited specifically to rigid, elongated links. In this instance, linkage 122 includes a first gear 128 in the form of a worm driven by a worm gear 175 on reversible motor 174 and driving a second gear 140 in the form of a second worm gear and a third worm gear, not seen coplanar. With and behind the second worm gear 140. Frame 124 further supports a plate 142 for vertical movement. The ear levers 130, 132 are pivotally supported from the frame with tongues 130a, 132a, which are received in slot 144a, 144b, respectively, on opposite lateral sides of the plate 142. Second worm gear 140 is suggestedly coaxial with and abutting the side of eyelid cylinder 126 to directly rotate the cylinder 126 by friction. The hidden worm gear raises and lowers plate 142 by means of a rack 148 on plate 142. If desired, positional switches 152, 154 and 156 can be located along the path of movement of plate 142 to be contacted and closed when the plate 142 as indicated in phantom in FIG. 9 to control the raising and lowering of plate 142 and, indirectly, the rotation of cylinder 126, to raise or lower the ears 131, 133 and the eyelids 127 to appropriate degrees.

Operation of the talking book 10 and talking, animated toy FIG. 110 will now be described. It should be appreciated that each device, the book 10 and the toy FIG. 110 can be operated and played with separately. When the book 10 is closed, the electrical circuitry is preferably in a sleep mode with the processor 64 powered down awaiting a signal from one of the spring loaded, depressible switches 82, 84, 86 indicating that the book 10 has been opened. The processor 64 may be programmed in a variety of ways to respond to different switch activations. One possible scenario is that when the front cover 20 opens and depresses the first switch 82, the book processor 64 generates signals controlling the book synthesizer 60 to generate a first sound bite, which may or may not be speech, using data from the book memory 62. At the same time, the book processor 64 transmits a control signal from its transmitter 70 through the communications link 12 to the receiver 170 forming the other end of the link in the toy FIG. 110. The control signal is passed from the receiver 170 to the figure processor 164 which, is programmed to produce a response in the toy FIG. 110. This response may include the generation of a sound bite with the figure synthesizer 160 using data from the figure memory 162 or operation of the actuator 120 to raise plate 142 and rotate cylinder 126 to raise the ears 131, 133, respectively, of the figure, or both. The processor 164 monitors the switches 182, 184, 186 and turns off the motor 174 when the plate 142 and gear 140 have reached the maximum extent of their desired movement.

Referring to FIG. 1, the user can depress either switch 76, 78 in book 10 to initiate a response from the book 10 and/or the toy FIG. 110. In one scenario, the book processor 64 is configured to respond to the depression of only the first hinge pin switch 82 by the front cover and the momentary contact switch 76 in the front cover 20 to generate a speech bite which relates to the information 22 printed on the inside of the front cover 20. It similarly responds to a depression of the rear cover switch 78 through openings 36 and 46, which overlying that switch and extend through the inner pages 30, 40, to generate a speech bite using the synthesizer 60 and speech data from the memory 62, which corresponds to the information contained in the printing 31 on the first side of the first page 30 visible in FIG. 1. The book processor 64 can be configured to generate control signals transmitted through the communication link 12 to the processor 164 in the toy FIG. 110. The processor 164 can be configured to also generate a sound bite which may be speech, music, a sound effect or any other sound, and may further be configured to operate the actuator 120 to move the ears 131, 133 and eyelids cylinder 126, for example, momentarily raise and lower the ears 131, 133 and eyelids 127 from and to their original raised position in FIG. 1 in response to a control signal from book processor 64.

Referring to FIG. 2, when the first page 30 is turned, the book processor 64 may be configured to transmit a control signal via the link 12 to the processor 164 of the toy FIG. 110 which responds by operating the actuator 120 to reverse motor 174 to drop plate 142 and rotate worm gear 140 until the second switch 184 is released, at which time power to the motor 174 is halted. This is depicted in FIG. 2. The eyelids 127 and ears 131, 133 are lowered somewhat from their positions in FIG. 1. The book processor 64 can also be configured to automatically generate a sound bite in response to the depression of the second hinge pin switch 84 caused by turning of the first page 30. With the book 10 in the configuration shown in FIG. 2, the processor 64 is suggestedly programmed to respond to the momentary depression of either cover switch 76, 78 by generating a sound bite which is appropriate for the information contained in the printing 32 on the second side of the first page 30 or the printing 41 on the first side of the second page 40, respectively.

Referring to FIG. 3, when the second page 40 is rotated away from the rear cover 50, the book processor 64 generates and transmits yet another control signal via the communication link 12 to the receiver 170 of the toy FIG. 110. The figure processor 164 responds to the transmitted control signal in some way, suggestedly powering the motor 174 to further lower plate 142 and rotate second worm gear 140 coupled to cylinder 126 to further "lower" the eyelids 127 and ears 131, 133. Again, a sound bite may be generated by the processor 164 using the synthesizer 160 and data from the memory 162. Again, book 10 responds to the depression of the third hinge pin switch 86 by the cam surface 43a of the second page 40 to generate appropriate sound bites for the depression of either cover switch 76, 78.

Figure 4:
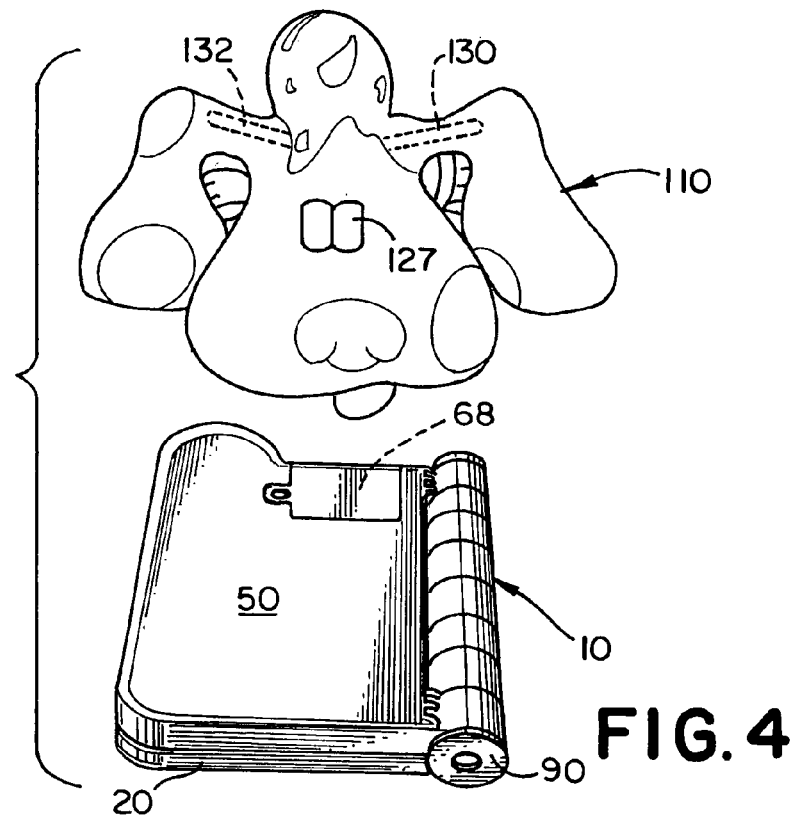
FIG. 4 is a perspective view of a talking book and talking figure combination of the present invention in a third configuration.

Referring to FIG. 4, when the book 10 is again completely closed, the book processor 64 responds to the release of all three switches 82, 84, 86, recognizing that the book 10 has been closed. In the described embodiment, processor 64 generates a control signal sent through transmitter 70 via the link 12 to receiver 17 of the toy FIG. 110. Figure processor 164 responds to the book processor 64 control signal in an appropriate manner, for example, by supplying power to the motor 174 to lower plate 140 to its lowermost position and rotate second gear 140 and cylinder 126 to their other extreme position, thereby lowering the ears 131, 133 to their lowest position and fully closing the "eyelids" 127. Figure processor 164 may additionally or, in the alternative, generate an appropriate sound through figure synthesizer 160 using sound data from the memory 162. Processor 64 can also be programmed to control book synthesizer 60 to generate its own sound bite from sound generated in the book memory 62 to indicate closure of the book 10. After generating both sound bites, the respective processors 64, 164 are preferably configured to "power down" to await a user control signal from one of the user control switches 82, 84, 86 and/or 180.

It will be appreciated that when the toy FIG. 110 is unconnected or out of range from the book 10 to break the communication link 12, the book 10 will operate as described above generating appropriate sounds when the book is opened or closed, the pages turned and/or inner cover buttons 76, 78 depressed. It should be appreciated that by provision of manually actuated, momentary contact switch 180 in toy FIG. 110 that the figure controller 164 can be prompted by signals generated from the closure of the switch 180 to perform the functions it would perform in response to control signals generated by processor 64 and transmitted over the link 12. If desired, multiple contact switches can be provided in the toy figure, each corresponding to one of the four different states of the toy FIG. 110 illustrated in FIGS. 1 through 4. Alternatively, the toy figure processor 164 can be programmed to respond with one of the four states, either serially or randomly, to each successive depression of the contact switch 180.

It will be appreciated by those skilled in the art that changes could be made to the embodiments described above without departing from the broad inventive concept thereof. For example, while the book 10 controls the actions of the toy FIG. 110, the combination components could be configured to control the actions of the book, particularly the generation of sound bites, through the toy figure. While the toy figure has been programmed to perform a sequence of actions, both sound generation and animation, in a predetermined order in response to sequential closures of a manually activated switch 180, the toy figure processor 164 could be programmed to perform the same steps in a random order in response to depression of the switch 180 or other additional momentary closure switches can be provided on the toy figure, for example, in the other limbs or elsewhere, each controlling a separate, predetermined response (sound generation and/or animation) of the toy figure. While certain electrical and electromechanical components are shown, other known components which can accomplish the same results might be provided. For example, any of a variety of switches may be employed, different speakers used, ultra sound or light (e.g., infrared), wireless links could be used in contrast to radio frequency and hard wire links already noted, and different actuator arrangements might be employed, including liquid crystal displays representing animated features of the toy figure and other types of mechanical actuators, including hydraulic, pneumatic and/or magnetic. While separate synthesizer memory and processor components are shown, any two or all three may be combined into a single element or chip. The synthesizer 64, 164, however, would at least include a digital to analog converter to convert digital sound data into an analog signal used to drive whatever speaker is used. Also, the digital to analog converter could be collocated with the speaker rather than the processor. It is understood, therefore, that this invention is not limited to the particular embodiments disclosed, but it is intended to cover modifications within the spirit and scope of the present invention as defined by the appended claims.

The invention claimed is:

1. A talking book comprising:
   a hinge pin;
   a plurality of book leaves, the leaves including a front leaf, a back leaf, and at least one leaf therebetween, wherein at least two of the plurality of leaves are pivotably engaged with the hinge pin at one end of each leaf, each pivotably mounted leaf being movable between two positions on first and second lateral sides of the hinge pin;
   a processor configured to generate at least a first control signal and a second control signal to at least initiate speech generation by the talking book;
   at least a first leaf position indicating switch operably coupled with the processor and responsive to a pivotal position of at least a first one of the pivotably engaged leaves with respect to the hinge pin, wherein the at least first leaf position indicating switch indicates whether the first one of the leaves is on one of the first and second lateral sides;
   at least first and second mode switches operably coupled with the processor;
   a memory operably coupled with the processor and containing at least some speech data; and
   a speaker operably coupled with the processor to reproduce sound including speech.

2. The talking book of claim 1, wherein at least the first leaf position indicating switch is located inside the hinge pin.

3. The talking book of claim 2, wherein the book includes at least a second leaf position indicating switch coupled with the processor and separately responsive to a pivotal position of a second one of the pivotably engaged leaves of the book with respect to the hinge pin.

4. The talking book of claim 3, wherein at least the second leaf position indicating switch is located inside the hinge pin.

5. The talking book of claim 1 wherein the speaker is located in one of the front and back leaves.

6. The talking book of claim 1 wherein the processor is located in one of the front and back leaves.

7. The talking book of claim 1, wherein activation of the first mode switch causes the processor to generate the first control signal and activation of the second mode switch causes the processor to generate the second control signal, the first and second control signals generated depending at least, in part, upon a state of the at least first leaf position indicating switch when either of the first and second mode switches is activated.

8. The talking book of claim 7, wherein the book includes at least a second leaf position indicating switch and the first and second control signals generated depending at least, in part, upon states of the at least first and second leaf position indicating switches when either of the first and second mode switches is activated.

9. The talking book of claim 8, wherein the plurality of leaf position indicating switches are located in the hinge pin.

10. The talking book of claim 7, wherein the processor generates the first control signal to produce a first sound from the speaker for the first mode and further generates the second control signal to produce a second sound from the speaker for the second mode.

11. The talking book of claim 10 wherein the first sound relates to information printed on a leaf open on the first lateral side and the second sound relates to information printed on a leaf open on the second lateral side.

12. The talking book of claim 1, wherein a separate one of the at least two mode switches is located on each of the front and back leaves.

13. The talking book of claim 1 wherein the at least one page has an opening through a portion of the page extending through the page, the location of the opening corresponding to the location of at least one of the mode switches on one of the front and back leaves, such that the mode switch is accessible to a user when the page overlies the one of the front and back leaves.

14. The talking book of claim 1 further comprising a wireless signal transmitter operably coupled to the processor.

15. The talking book of claim 1 in combination with a separate, sound producing device, the separate sound producing device comprising:
   a device processor;
   a sound synthesizer operably coupled to the device processor;
   a device memory operably coupled with the sound synthesizer and containing at least some sound data;
   a speaker operably coupled with the sound synthesizer to reproduce sounds; and
   a communications link between the talking book and the sound producing device configured to at least transfer sound control signals generated by the processor of the talking book to initiate sound generation by the sound producing device.

16. The combination of claim 15, wherein the communications link is wireless.

17. The combination of claim 15, wherein the talking book includes at least one manually actuated switch operably coupled to the talking book processor to initiate sound generation by the talking book processor through the talking book speaker and the generation of the sound control signals transferred to the sound producing device.

18. The combination of claim 15, wherein the processor of the toy item is configured to at least generate speech control signals to initiate speech generation by the sound synthesizer of the sound producing device and at least one manually actuated switch on the sound producing device operably coupled to the device processor to selectively manually initiate the generation of speech by the sound producing device independently of the talking book.

19. The combination of claim 18 wherein the sound producing device further comprises a manually operated switch operably coupled to the device processor to at least initiate operation of the actuator through the device processor.

20. The combination of claim 15, wherein the sound producing device includes an actuator operably coupled with some portion of the sound producing device to animate the portion of the sound producing device when the actuator is operated and wherein the device processor is operably coupled with the actuator to operate the actuator to control animation of the portion of the sound producing device.

21. The talking book of claim 1 in combination with a separate, animated device, the animated device comprising:
   an actuator operably coupled with some portion of the animated device to animate the portion of the animated device when the actuator is operated; and
   a communications link operably coupling the processor of the talking book with the actuator of the animated device.

22. The combination of claim 21, wherein at least a portion of the communications link is wireless.

23. The combination of claim 21, wherein the animated device includes a manually actuated switch operably coupled with the actuator to initiate operation of the actuator independently of the talking book.

24. The combination of claim 21, wherein the animated device has a processor and wherein the processor of the book is operably coupled to the actuator through the communications link including the device processor.

25. The combination of claim 24, wherein the animated device has
   a sound synthesizer operably coupled to the device processor;
   a device memory operably coupled with the sound synthesizer and containing at least some sound data; and
   a speaker operably coupled with the sound synthesizer to reproduce sounds.

* * * * *